(12) United States Patent
Jang et al.

(10) Patent No.: US 11,088,763 B2
(45) Date of Patent: Aug. 10, 2021

(54) ROI-BASED OPTICAL WIRELESS COMMUNICATION METHOD AND DEVICE

(71) Applicant: KOOKMIN UNIVERSITY INDUSTRY ACADEMY COOPERATION FOUNDATION, Seoul (KR)

(72) Inventors: Yeong Min Jang, Seoul (KR); Van Trang Nguyen, Seoul (KR)

(73) Assignee: KOOKMIN UNIVERSITY INDUSTRY ACADEMY COOPERATION FOUNDATION, Seoul (KR)

( * ) Notice: Subject to any disclaimer, the term of this patent is extended or adjusted under 35 U.S.C. 154(b) by 102 days.

(21) Appl. No.: 16/494,687

(22) PCT Filed: Dec. 31, 2017

(86) PCT No.: PCT/KR2017/015788
§ 371 (c)(1),
(2) Date: Dec. 10, 2019

(87) PCT Pub. No.: WO2018/169179
PCT Pub. Date: Sep. 20, 2018

(65) Prior Publication Data
US 2020/0252131 A1    Aug. 6, 2020

(30) Foreign Application Priority Data
Mar. 16, 2017 (KR) .................. 10-2017-0033272

(51) Int. Cl.
*H04B 10/50* (2013.01)
*H04B 10/516* (2013.01)
*H04B 10/67* (2013.01)

(52) U.S. Cl.
CPC ....... *H04B 10/5167* (2013.01); *H04B 10/502* (2013.01); *H04B 10/676* (2013.01)

(58) Field of Classification Search
CPC . H04B 10/5167; H04B 10/502; H04B 10/676
(Continued)

(56) References Cited

U.S. PATENT DOCUMENTS 8,334,898 B1 * 12/2012 Ryan ................... G01C 21/206
348/61
9,450,671 B2 * 9/2016 Chen ................... H04B 10/116
(Continued)

FOREIGN PATENT DOCUMENTS

KR    10-2012-0118747 A    10/2012
KR       10-1522720 B1       5/2015
(Continued)

*Primary Examiner* — Mohammad R Sedighian
(74) *Attorney, Agent, or Firm* — Goldilocks Zone IP Law (57) ABSTRACT

An optical wireless transmission device according to an embodiment of the present invention comprises: a modulation unit for receiving input of a first input signal and outputting a first output signal; and a light source control unit for controlling a first light source in accordance with the first output signal. The first output signal repeats "0" and "1" in a first phase during clock time if a binary value of the first input signal is 0, and repeats "0" and "1" in a phase opposite from the first phase during the clock time if a binary value of the first input signal is 1.

13 Claims, 9 Drawing Sheets

(58) Field of Classification Search
USPC .......................................................... 398/183
See application file for complete search history.

(56) References Cited

U.S. PATENT DOCUMENTS

| 10,560,188 | B2* | 2/2020 | Jang ..................... H04B 10/116 |
| 2015/0372755 | A1 | 12/2015 | Chung et al. |
| 2019/0238225 | A1* | 8/2019 | Nijssen ................ H04B 10/116 |

FOREIGN PATENT DOCUMENTS

| KR | 10-1550375 B1 | 9/2015 |
| KR | 10-2015-0145130 A | 12/2015 |
| KR | 10-1625534 B1 | 5/2016 |

* cited by examiner

ROI-BASED OPTICAL WIRELESS COMMUNICATION METHOD AND DEVICE

CROSS REFERENCE TO RELATED PATENT APPLICATION

This application claims the benefit under 35 U.S.C. Section 371, of PCT International Application No. PCT/KR2017/015788, filed on Dec. 31, 2017 which claimed priority to Korean Patent Application No. KR 10-2017-0033272, filed on Mar. 16, 2017 the disclosures of which are hereby incorporated by the references.

[Technical Field]

The present invention relates to a method and an apparatus for optical wireless communication based on RoI.

[Background Art]

Recently, as the Visible Light Communication (VLC) technique, which enables wireless communication by adding communication functions to a visible light wavelength using an infrastructure in which lighting of incandescent bulbs or fluorescent tubes is replaced by Light Emitting Diode (LED) lighting, is actively studied and IEEE 802.15.7 international standard specification is completed, development of business models for commercialization is in progress. However, since IEEE 802.15.7 is generally limited to data transmission using a photo diode (PD), it has a problem in that a dedicated communication apparatus such as a VLC dongle or the like should be used. Accordingly, international standardization of Optical Wireless Communications (OWC), which mainly uses an image sensor such as a camera of a smart phone rather than a photo diode and includes infrared and ultraviolet wavelengths, as well as visible light, is progressed in IEEE 802.15.7m OWC TG (Task Group).

The inventor of the present invention is the chairman of IEEE 802.15.7m OWC TG of International Standard Organization, leading OWC international standardization by presenting many contributions related to OWC techniques, and the present invention relates to an optical wireless communication system based on RoI, which is one of most essential techniques of OWC international standard techniques.

[Disclosure]

[Technical Problem]

The present invention is directed to providing a method and an apparatus for optical wireless communication based on RoI.

[Technical Solution]

An optical wireless transmission apparatus, according to an exemplary embodiment of the present invention, may comprise a modulation unit receiving a first input signal and outputting a first output signal; and a light source control unit controlling a first light source according to the first output signal, wherein when the first input signal is a binary value 0, the first output signal repeats 0 and 1 with a first phase for a clock time, and when the first input signal is a binary value 1, the first output signal repeats 0 and 1 with a phase opposite to the first phase for the clock time.

In an exemplary embodiment, the modulation unit may output a second output signal, the second output signal may be a signal obtained by inverting the first output signal, and the light source control unit may control a second light source according to the second output signal.

In an exemplary embodiment, the optical wireless transmission apparatus may further comprise a line coding unit receiving a second input signal and outputting the first input signal by encoding the second input signal at a 1/2 code rate. When an input signal is a binary value 0, the line coding unit may output binary values (1, 0) and when the input signal is a binary value 1, the line coding unit may outputs binary values (0, 1). Alternatively, when the input signal is a binary value 0, the line coding unit may output binary values (0, 1), and when the input signal is a binary value 1, the line coding unit may output binary values (1, 0).

In an exemplary embodiment, when the input signal is a binary value 0, the line coding unit may output binary values (1, 0), and when the input signal is a binary value 1, the line coding unit may output binary values (0, 1).

In an exemplary embodiment, the line coding unit may add a preamble (1, 1, 1, 1) or (0, 0, 0, 0) and extension bits (0, 1) or (1, 0) before the first input signal.

In an exemplary embodiment, the line coding unit may add a preamble (1, 1, 1, 1) and extension bits (0, 1) before the first input signal.

In an exemplary embodiment, the light source control unit may generate a third output signal having a data rate higher than the first output signal according to a third input signal having a data rate higher than the first binary data, control the first light source according to the third output signal, and control dimming of the third output signal according to the first output signal.

In an exemplary embodiment, the light source control unit may generate the third output signal using one of DSM-PSK, DCO-OFDM, ACO-OFDM, and DWT-OFDM.

An optical wireless reception apparatus, according to an exemplary embodiment of the present invention, may comprise an image reception unit receiving images obtained by photographing a light source at a first sampling rate from a first image sensor; and a demodulation unit outputting restored data of a first data rate based on the images, wherein the first data rate is half of the first sampling rate, and the demodulation unit compares flashing states of the light source with respect to two consecutive images, and outputs a binary value identical to or opposite to a previous value of the restored data as a next value of the restored data.

In an exemplary embodiment, when the flashing states of the light source with respect to the two consecutive images are equal, the demodulation unit may output the binary value opposite to the previous value of the restored data as the next value of the restored data, and when the flashing states of the light source with respect to the two consecutive images are different, the demodulation unit may output the binary value equal to the previous value of the restored data as the next value of the restored data.

In an exemplary embodiment, the demodulation unit may determine that a preamble is detected when the flashing states of the light source are equal for four consecutive images.

In an exemplary embodiment, the demodulation unit may determine that a preamble is detected when the flashing states of the light source are equal for three consecutive images.

In an exemplary embodiment, the demodulation unit may output first restored data after detecting a preamble as a binary value 1.

In an exemplary embodiment, the demodulation unit may output restored data for two images after detecting a preamble as a binary value 1.

In an exemplary embodiment, the demodulation unit may detect a position of the light source based on the images obtained by photographing the light source at the first sampling rate.

In an exemplary embodiment, the demodulation unit may obtain identification information of the light source from the restored data of the first data rate.

In an exemplary embodiment, the image reception unit may receive images obtained by photographing the light source at a second sampling rate higher than the first sampling rate from a second image sensor, and the demodulation unit may output restored data having a second data rate higher than the first data rate based on the images obtained by photographing the light source at the second sampling rate.

In an exemplary embodiment, the second image sensor may photograph the light source at the second sampling rate based on a position of the light source, which is detected based on the images obtained by photographing the light source at the first sampling rate.

In an exemplary embodiment, the demodulation unit may restore the restored data of the second data rate from the images obtained by photographing the light source at the second sampling rate based on the position of the light source, which is detected based on the images obtained by photographing the light source at the first sampling rate.

In an exemplary embodiment, the images may be photographed by a rolling shutter scheme, and the demodulation unit may obtain restored data with respect to different rows in which the light source is photographed in the two consecutive images, and determine final restored data through a majority voting based on the restored data.

An optical wireless reception apparatus, according to an exemplary embodiment of the present invention, may comprise an image reception unit receiving images obtained by photographing a light source from an image sensor; and a demodulation unit outputting restored data based on the images, wherein a data rate of the restored data is half of a sampling rate of the received images, and the demodulation unit determines the restored data according to following equations:

$$y_k = \text{XOR}(x_k, x_{k-1})$$

$$b_m = b_{m-1} + (y_{2m-1} + y_{2m}) \quad [\text{mod-2}]$$

(Here, $x_k$ is a flashing state of the light source in a k-th image, and $b_m$ is m-th restored data).

An optical wireless transmission method, according to an exemplary embodiment of the present invention, may comprise receiving, by a modulation unit, a first input signal and outputting a first output signal; and controlling, by a light source control unit, a first light source according to the first output signal, wherein when the first input signal is a binary value 0, the first output signal repeats 0 and 1 with a first phase for a clock time, and when the first input signal is a binary value 1, the first output signal repeats 0 and 1 with a phase opposite to the first phase for the clock time.

An optical wireless reception method, according to an exemplary embodiment of the present invention, may comprise receiving, by an image reception unit, images obtained by photographing a light source at a first sampling rate from a first image sensor; and outputting, by a demodulation unit, restored data of a first data rate based on the images, wherein the first data rate is half of the first sampling rate, and the outputting of the restored data of the first data rate comprises comparing flashing states of the light source with respect to two consecutive images, and outputting a binary value identical to or opposite to a previous value of the restored data as a next value of the restored data.

An optical wireless reception method, according to an exemplary embodiment of the present invention, may comprise receiving, by an image reception unit, images obtained by photographing a light source from an the image sensor; and outputting, by a demodulation unit, restored data based on the images, wherein a data rate of the restored data is half of a sampling rate of the received images, and the demodulation unit determines the restored data according to following equations:

$$y_k = \text{XOR}(x_k, x_{k-1})$$

$$b_m = b_{m-1} + (y_{2m-1} + y_{2m}) \quad [\text{mod-2}]$$

(Here, $x_k$ is a flashing state of the light source in a k-th image, and $b_m$ is m-th restored data).

The present invention includes a computer program stored on a recording medium for executing a method according to an exemplary embodiment of the present invention on a computer.

The present invention includes a computer-readable recording medium in which a program for performing a method according to an exemplary embodiment of the present invention is recorded.

[Advantageous Effects]

According to the present invention, it is possible to efficiently perform optical wireless communication based on RoI. In particular, a fast moving light source such as a tail light of a traveling vehicle can be effectively detected.

MODES OF THE INVENTION

Hereinafter, preferred embodiments of the present invention will be described in detail with reference to the accompanying drawings to clarify the spirit of the present invention. In describing the present invention, when it is determined that specific description of already known functions or constitutional components related to the present invention may make the gist of the present invention unclear, detailed description thereof will be omitted. Whenever possible, the same reference numerals and symbols are assigned to the constitutional components practically having the same functional configuration in the drawings although they are shown in different drawings. For the convenience of explanation, apparatuses and methods are described together in case of necessity.

Figure 1:
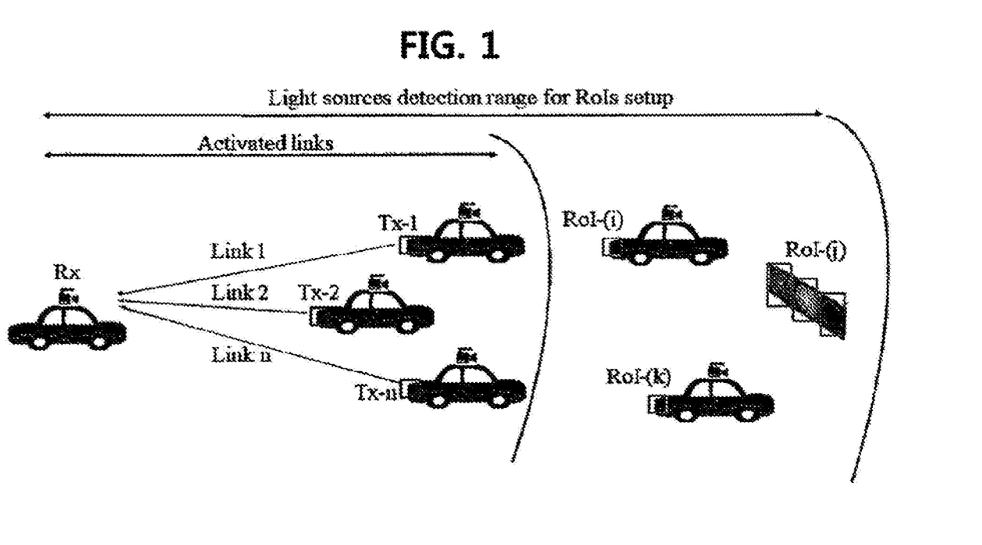
FIG. 1 is a diagram schematically illustrating an operation of a region of interest (RoI) based optical wireless communication system according to an exemplary embodiment of the present invention.

FIG. 1 is a diagram schematically illustrating an operation of a region of interest (RoI) based optical wireless communication system according to an exemplary embodiment of the present invention. Referring to FIG. 1, an optical wireless reception apparatus provided in a vehicle may photograph another vehicle including an optical wireless transmission apparatus or a traffic light using an image sensor, detect a position of a light source of the optical wireless transmission apparatus in the photographed image, and determine one or more RoIs. The optical wireless reception apparatus may receive high speed data in an optical wireless communication manner at the determined RoI. The speed of the high speed data may be in Mbps to Gbps units.

Figure 2:
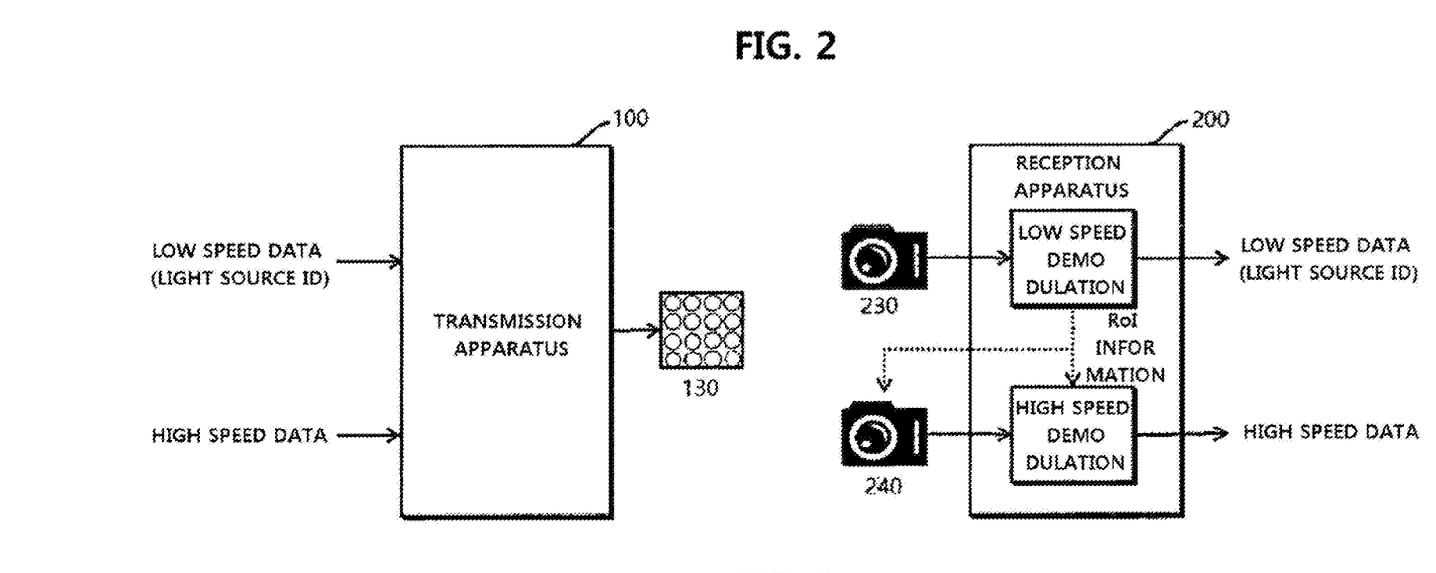
FIG. 2 is a diagram schematically illustrating a configuration of a RoI based optical wireless communication system according to an exemplary embodiment of the present invention.

FIG. 2 is a diagram schematically illustrating a configuration of a RoI based optical wireless communication system according to an exemplary embodiment of the present invention. Referring to FIG. 2, an optical wireless transmission apparatus 100 may transmit low speed data and high speed data through a light source 130. The light source 130 may be one light source or may include a plurality of light sources. The low speed-data may be identification information of the light source 130.

An optical wireless reception apparatus 200 may receive images obtained by photographing the light source 130 from an image sensor 230, determine a RoI based on the received images, and restore the low speed data. The optical wireless reception 200 may obtain identification information of the light source 130 from the restored low speed data. The image sensor 230 may be a stereo camera.

The optical wireless reception apparatus 200 may receive images obtained by photographing the light source 130 from an image sensor 240, and restore the high speed data based on the received images. In this case, the RoI determined above may be used. It is also possible to use the identification information of the light source. In particular, when a plurality of light sources are found, the RoI of each light source may be distinguished by the corresponding identification information. The images received from the image sensor 240 may be images captured at a higher sampling rate than the images received from the image sensor 230. The images received from the image sensor 240 may be images captured at a higher resolution than the images received from the image sensor 230.

The image sensor 240 may be different from or the same as the image sensor 230. For example, the two image sensors may be different from each other, and the image sensor 230 may be an image sensor having low performance such as frame rate and resolution, and the image sensor 240 may be an image sensor having high performance such as frame rate and resolution. The two image sensors may be synchronized, and each operation may be performed simultaneously. The low performance image sensor part 230 and the high performance image sensor part 240 may be included within one image sensor 230 or 240. In this case, the two image sensor parts may be image sensors that operate in different schemes. The optical wireless reception apparatus 200 may use one image sensor 230 or 240, operate the image sensor at low performance (e.g., at a low frame rate) during RoI detection and/or low speed data recovery, and operate the image sensor at high performance (e.g., at a high frame rate) during high speed data recovery.

The image sensor 240 may capture images at a high performance, for example, at a high frame rate, for the corresponding RoI portion using the RoI information. The RoI information may be used when the optical wireless reception apparatus 200 demodulates the high-speed data from the images received from the image sensor 240.

Figure 3:
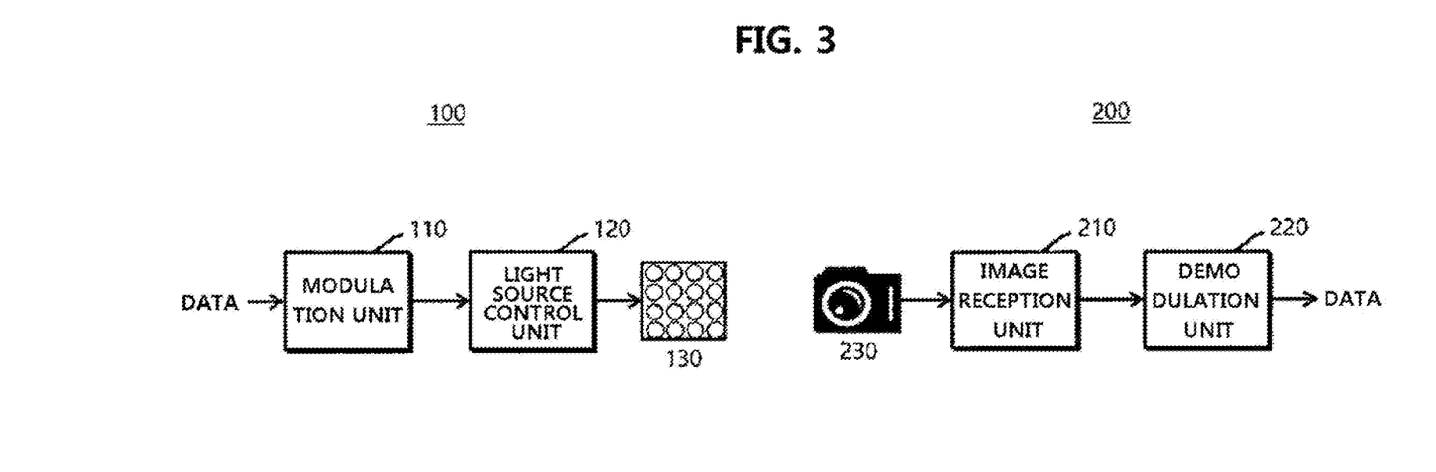
FIG. 3 is a diagram schematically illustrating a configuration of a system for transmitting and receiving data at low speed using an optical wireless communication method to transmit and receive low speed data and determine RoI in FIG. 2.

FIG. 3 is a diagram schematically illustrating a configuration of a system for transmitting and receiving data at low speed using an optical wireless communication method to transmit and receive low speed data and determine RoI in FIG. 2. Referring to FIG. 3, the optical wireless transmission apparatus 100 according to an exemplary embodiment of the present invention may include a modulation unit 110 and a light source control unit 120, and the optical wireless reception apparatus 200 according to an exemplary embodiment of the present invention may include an image reception unit 210 and a demodulation unit 220.

The modulation unit 110 may modulate data to be transmitted, and the light source control unit 120 may control the light source 130 based on the modulated data. The image reception unit 210 may receive images of the light source 130 from the image sensor 230, and the demodulation unit 220 may restore data from the received images.

Figure 4:
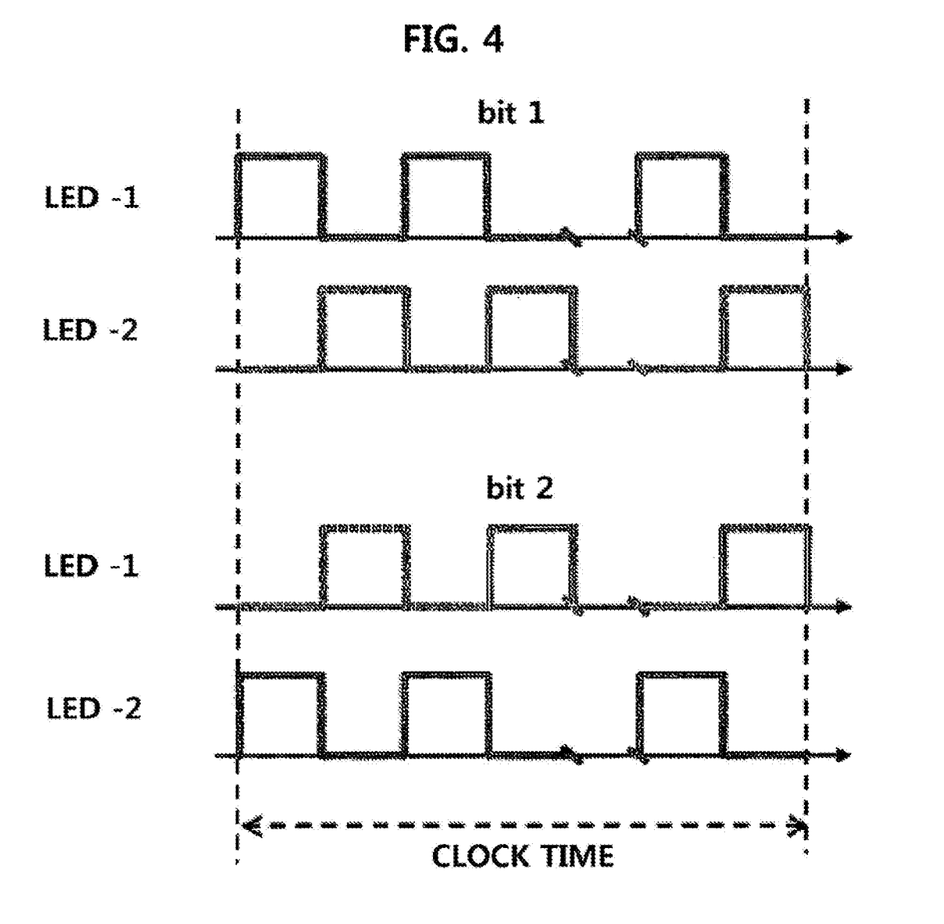
FIG. 4 is a diagram illustrating a signal for controlling a light source according to an output signal of a modulation unit.

For convenience of description, an input signal of the modulation unit 110 may be called a first input signal, and an output of the modulation unit may be called a first output signal. The first output signal may repeat 0 and 1 with a first phase for a clock time when the first input signal is a binary value 0, and may repeat 0 and 1 with a phase opposite to the first phase for the clock time when the first input value is a binary value 1. For example, the modulation unit may output (0, 1, 0, 1, . . . ) when the first input signal is a binary value 0, and may output (1, 0, 1, 1, . . . ) when the first input signal is a binary value 1. The light source control unit may flash the first light source 130 according to the first output signal. The modulation unit may output a second output signal obtained by inverting the first output signal, and the light source control unit may control the second light source according to the second output signal. FIG. 4 is a diagram illustrating a signal for controlling a light source according to an output signal of a modulation unit. The clock speed may be 10 Hz and the clock time may be 0.1 second.

The optical wireless transmission apparatus 100 may include a line coding unit in front of the modulation unit 110. That is, an output of the line coding unit may become the first input signal which is an input signal of the modulation unit 110. For convenience of description, the input signal of the line coding unit may be called a second input signal. The line coding unit may encode the input signal at a code rate of 1/2 according to Table 1 and output the coded input signal. That is, the line coding unit may output binary values (1, 0) when the input signal is a binary value 0, and output binary values (0, 1) when the input signal is a binary value 1.

TABLE 1

| Input bit | Output code |
|---|---|
| 0 | 1 0 |
| 1 | 0 1 |

Unlike Table 1, the line coding unit may output binary values (0, 1) when the input signal is a binary value 0, and output binary values (1, 0) when the input signal is a binary value 1. However, the following description is based on Table 1.

The line coding unit part may add a preamble (1, 1, 1, 1) or (0, 0, 0, 0) in front of the output signal, that is, the first input signal. The following description is based on the case of adding the preamble (1, 1, 1, 1).

The line coding unit may add extension bits (0, 1) or (1, 0) in front of the first input signal. The following description is based on the case of adding the extension bits (0, 1). The addition of the extension bits (0, 1) to the output signal by the line coding unit may correspond to addition of the extension bit 1 before the second input signal, that is, the data to be transmitted.

The operation of the modulation unit 110 described above may be summarized as shown in an example of Table 2.

images obtained by photographing the light source, which are received from the image sensor 230, and the data rate of the data restored by the demodulation unit 220 may also be half of the sampling rate of the images obtained by photographing the light source, which are received from the image sensor 230.

The demodulation unit 220 of the optical wireless reception apparatus 200 may compare flashing states of the light source 130 in two consecutive images as follows.

$$y_k = \mathrm{XOR}(x_k, x_{k-1})$$

$x_k$ is a flashing state of the light source 130 in the k-th image.

When the demodulation unit receives the transmission data, $y_k$ does not become zero three times in succession. When the demodulation unit receives the preamble, $y_k$ may become zero three times in succession. Thus, the demodulation unit may detect the preamble. That is, the demodula-

TABLE 2

|  | Two bit interval | Extension bit | Data bit 1 | Data bit 2 | Data bit 3 | Data bit 4 |
|---|---|---|---|---|---|---|
| Data bit |  | 1 | 0 | 1 | 0 | 0 |
| RLL code |  | 0 1 | 1 0 | 0 1 | 1 0 | 1 0 |
| Preamble added | 1 1 1 1 | 0 1 | 1 0 | 0 1 | 1 0 | 1 0 |
| LED-1 waveform | $(1\ 0\ \ldots)_{4n}$ | $(01\ \ldots)_n\ (10\ \ldots)_n$ | $(10\ \ldots)_n\ (01\ \ldots)_n$ | $(01\ \ldots)_n\ (10\ \ldots)_n$ | $(10\ \ldots)_n\ (01\ \ldots)_n$ | $(10\ \ldots)_n\ (01\ \ldots)_n$ |
| LED-2 waveform | $(0\ 1\ \ldots)_{4n}$ | $(10\ \ldots)_n\ (01\ \ldots)_n$ | $(01\ \ldots)_n\ (10\ \ldots)_n$ | $(10\ \ldots)_n\ (01\ \ldots)_n$ | $(01\ \ldots)_n\ (10\ \ldots)_n$ | $(01\ \ldots)_n\ (10\ \ldots)_n$ |

An error correction code may be used to correct errors in the low speed data transmission, and a majority vote may be used when the frame rate of the image sensor is multiple times the clock rate of the transmission side.

Figure 5:
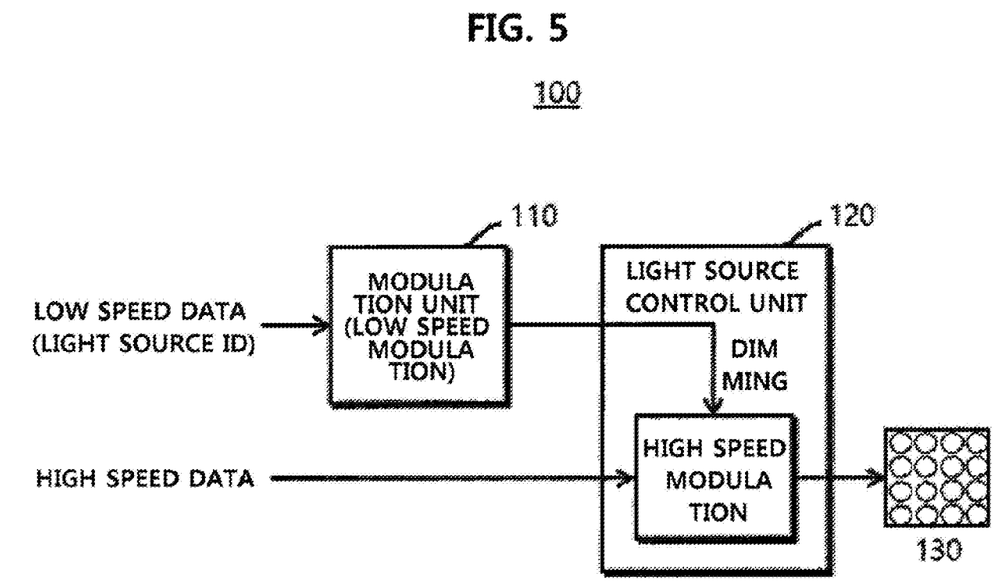
FIG. 5 is a diagram illustrating in more detail the configuration of the optical wireless transmission apparatus 100 according to an exemplary embodiment of the present invention.
Figure 6:
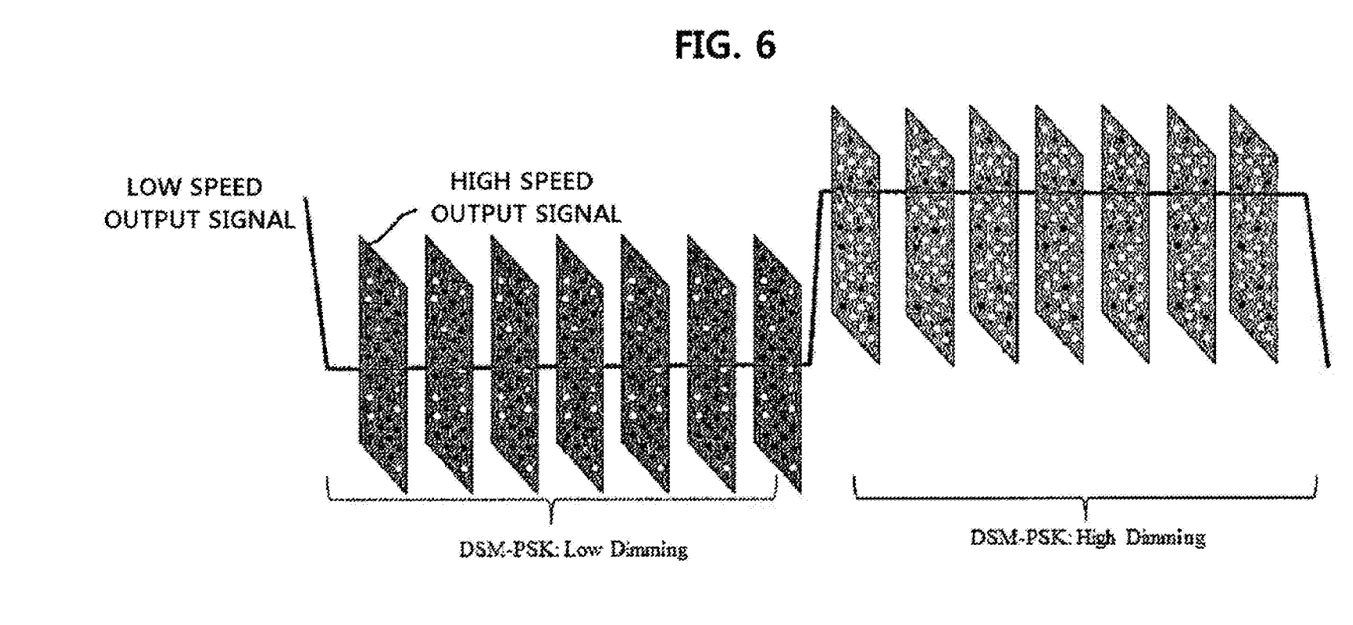
FIG. 6 is a diagram illustrating an exemplary embodiment in which dimming control is performed with a low speed output signal while high speed modulation is performed in a DSM-PSK scheme.

FIG. 5 is a diagram illustrating in more detail the configuration of the optical wireless transmission apparatus 100 according to an exemplary embodiment of the present invention. Referring to FIG. 5, the light source control unit 120 may receive high speed data, and generate an output signal for controlling the light source 130 through a high speed modulation scheme. The high speed modulation scheme may be DSM-PSK, DCO-OFDM, ACO-OFDM, or DWT-OFDM scheme. For convenience, an input signal and an output signal according to the high speed modulation scheme may be referred to as a third input signal and a third output signal, respectively. Dimming of the third output signal may be controlled according to the first output signal output from the modulation unit 110. FIG. 6 is a diagram illustrating an exemplary embodiment in which dimming control is performed with a low speed output signal while high speed modulation is performed in a DSM-PSK scheme. The reception side may determine that the dimming of the light source is a low speed flash, and restore the low speed data therefrom.

Referring back to FIG. 3 again, the images of the light source 130 received by the image reception unit 210 from the image sensor 230 may be those sampled every clock time of the transmission side. In this case, since the clock of the transmission side is a clock of a low-speed transmission data, that is, a signal after the second input signal passes the line coding unit having a code rate 1/2, that is, a clock of the first input signal, a data rate of the second input signal that is transmission data may be half of a data rate according to the clock on the transmission side. Accordingly, the data rate of the transmission data is half of the sampling rate of the tion unit may determine that the preamble is detected when the flashing states of the light source are the same for the four consecutive images. The demodulation unit may determine that the preamble is detected when the flashing states of the light source are the same for the three consecutive images.

After detecting the preamble, $y_k$ may become (1, 1) according to reception of the extension bit, and the demodulation unit may determine the restored data for this as a binary value 1, and output it. That is, the demodulation unit may output the restored data of two images after the preamble detection as a binary value 1, which is an extension bit.

The demodulation unit may restore the transmission data by outputting a binary value identical to or opposite to the previous output value as the next output value according to $y_k$. For example, the demodulation unit may output a binary value opposite to the previous value of the restored data as the next value of the restored data when the flashing states of the light source for two consecutive images are the same, and output a binary value equal to the previous value of the restored data as the next value of the restored data when the flashing states of the light source for two consecutive images are different from each other.

The operation of the demodulation unit described above may be as shown in Table 3 or Table 4 depending on a time point at which the image is sampled.

TABLE 3

| Captured LED, $x_k$ | 0 0 0 0 | 1 0 | 0 1 | 1 0 | 0 1 | 0 1 |
|---|---|---|---|---|---|---|
| RLL decoding, $y_k$ | –0 0 0 | 1 1 | 0 1 | 0 1 | 0 1 | 1 1 |
| Preamble | >=three | No appearance of two zeros |  |  |  |  |

TABLE 3-continued

| detection | zeros | continuously. | | | | |
|---|---|---|---|---|---|---|
| Packet reconstruct | Detected preamble | | | | | |
| Data bit | | 1 | 0 | 1 | 0 | 0 |

TABLE 4

| Captured LED, $x_k$ | 0 0 0 0 | 1 0 | 0 1 | 1 0 | 0 1 | 0 1 |
|---|---|---|---|---|---|---|
| RLL decoding, $y_k$ | –0 0 0 | 1 1 | 0 1 | 0 1 | 0 1 | 1 1 |
| Preamble detection | >=three zeros | No appearance of two zeros continuously. | | | | |
| Packet reconstruct | Detected preamble | | | | | |
| Data bit | | 1 | 0 | 1 | 0 | 0 |

The operation of the demodulation unit may be expressed as follows.

$$y_k = \text{XOR}(x_k; x_{k-1})$$

$$b_m = b_{m-1} + (y_{2m-1} = y_{2m}) \quad [\text{mod-2}]$$

Here, $x_k$ is a flashing state of the light source in the k-th image, and $b_m$ is the m-th restored data.

The demodulation unit may obtain only $y_{2m}$ to obtain the restored data according to the following equation.

$$b_m = b_{m-1} + (y_{2m-1} + 1) \quad [\text{mod-2}]$$

Figure 7:
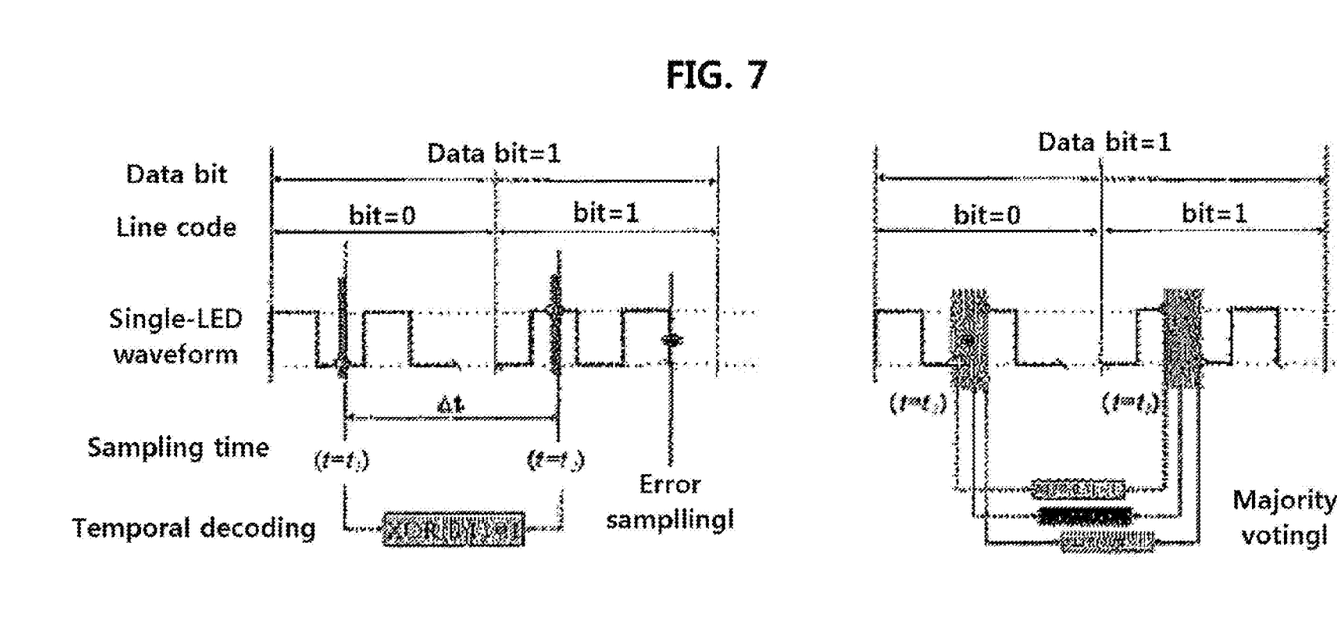
FIGS. 7 and 8 are diagrams illustrating a multi-phase sampling method according to an exemplary embodiment of the present invention.
Figure 8:
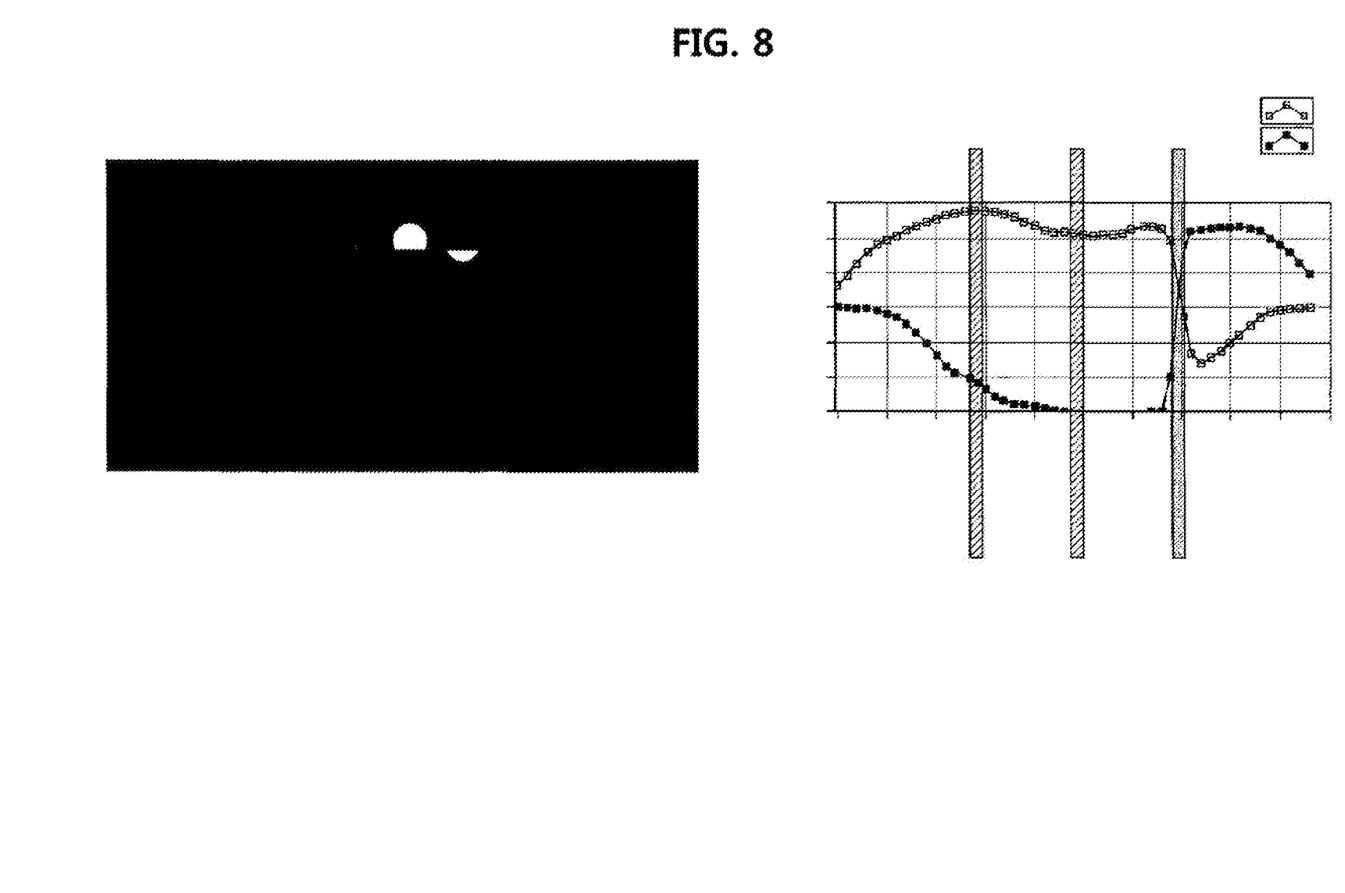

FIGS. 7 and 8 are diagrams illustrating a method of correcting an error occurring when sampling at an ON/OFF switching time of a light source through multi-phase sampling when using a rolling shutter image sensor according to an exemplary embodiment of the present invention.

When photographing with a rolling shutter scheme, since the respective rows are sampled at different times, the flashing states of the light source may be photographed at various phases, and therefore errors may be corrected by majority voting or the like. That is, the demodulation unit may obtain the restored data for different rows in which the light source is photographed in two consecutive images, and determine the final restored data by applying a majority voting to the restored data.

Figure 9:
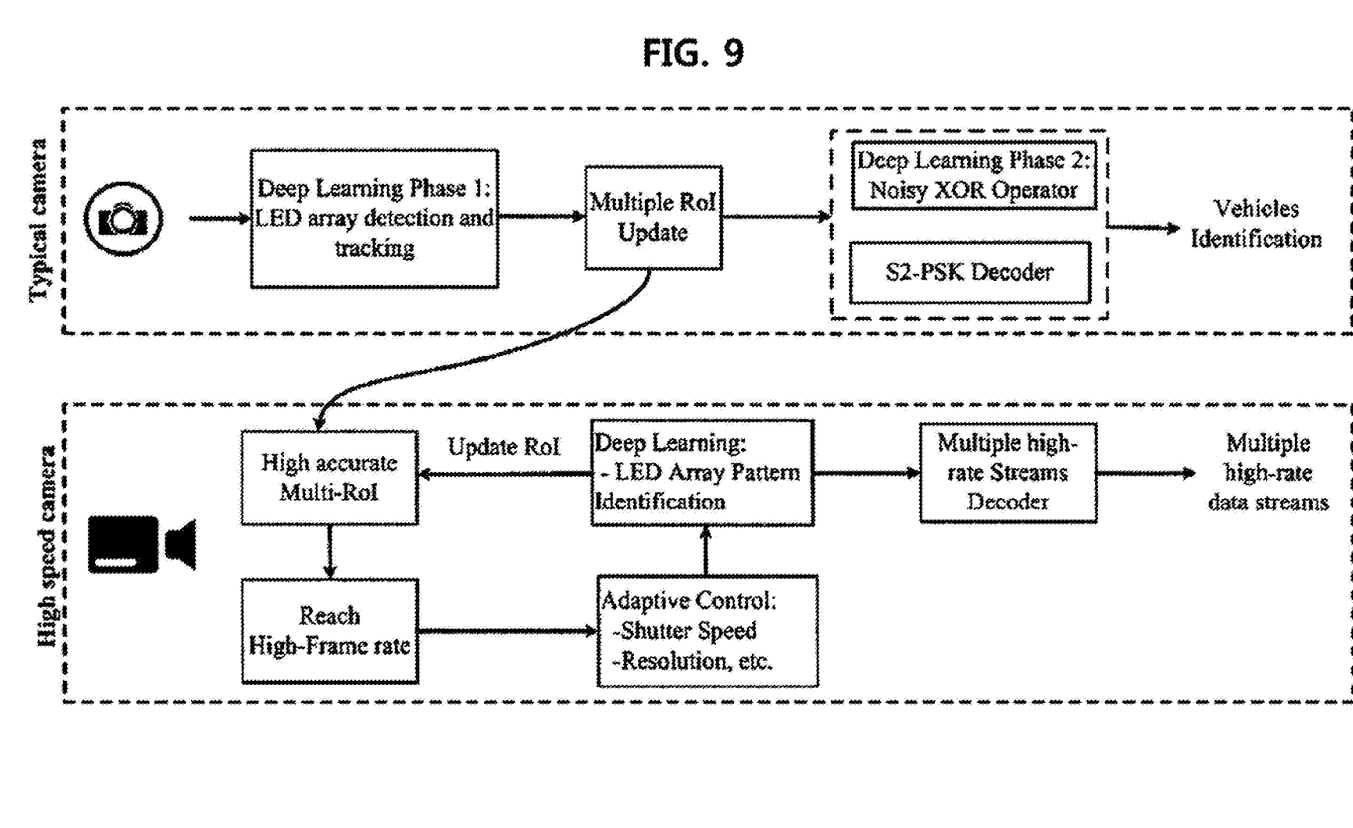
FIG. 9 is a diagram illustrating a method of applying a deep learning network to light source detection, low speed data recovery, and high speed data recovery in an optical wireless communication system according to an exemplary embodiment of the present invention.

In the optical wireless communication system according to an exemplary embodiment of the present invention, a deep learning network may be applied to the light source detection, the low speed data recovery, and the high speed data recovery as shown in FIG. 9. The deep learning for the high speed data recovery may be used to detect a plurality of light sources with respect to the determined RoI or to classify the flashing state of the light source into three categories: ON, OFF, and UNCLEAR.

Figure 10:
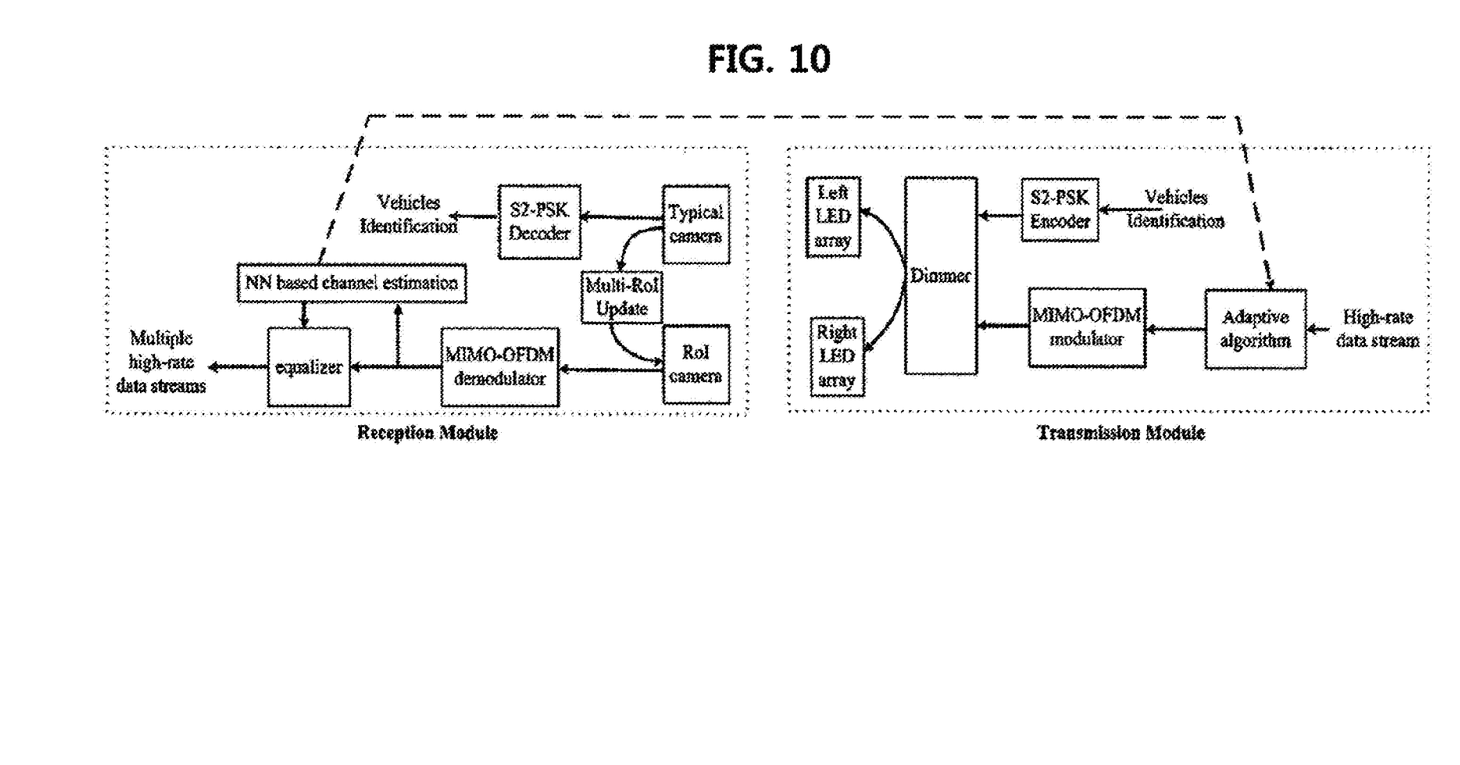
FIG. 10 is a diagram illustrating a method of applying adaptive control to an optical wireless communication system according to an exemplary embodiment of the present invention.

In order to maximize the communication performance and minimize the computation amount, adaptive control may be performed on frame rate, shutter speed, resolution, etc. of the high speed image sensor as shown in FIG. 10. The uplink may be implemented in the same way as the downlink. In bidirectional communication, a channel estimation function may be implemented. By channel estimation, channel information may be fed back to the adaptive control for algorithm, mapping, modulation, coding, etc. of the high-speed data transmission.

The present invention has been described in detail focusing on the preferred embodiments shown in the drawings. These embodiments are not to restrict the present invention but only illustrative, and should be considered from the descriptive viewpoint, not restrictive viewpoint. The real technical protection scope should be defined by the technical spirit of the appended claims, not by the descriptions stated above. Although specific terms are used in the specification, they are used only for the purpose of describing the concept of the present invention, not to restrict the meaning or limit the scope of the present invention stated in the claims. Each step of the present invention does not need to be necessarily performed in the stated order and may be performed in parallel, selectively or individually. Those skilled in the art may understand that various modified forms and equivalent other embodiments are possible without departing from the fundamental spirit of the present invention. It should be understood that the equivalents include equivalents that will be developed in the future, as well as presently known equivalents, i.e., all constitutional components invented to perform the same function regardless of a structure.

The invention claimed is:

1. An optical wireless reception apparatus, the optical wireless reception apparatus comprising:
   an image reception unit receiving images obtained by photographing a light source at a first sampling rate from a first image sensor; and
   a demodulation unit outputting restored data of a first data rate based on the images,
   wherein the first data rate is half of the first sampling rate, and the demodulation unit compares flashing states of the light source with respect to two consecutive images, and outputs a binary value identical to or opposite to a previous value of the restored data as a next value of the restored data.

2. The optical wireless reception apparatus according to claim 1, wherein when the flashing states of the light source with respect to the two consecutive images are equal, the demodulation unit outputs the binary value opposite to the previous value of the restored data as the next value of the restored data, and when the flashing states of the light source with respect to the two consecutive images are different, the demodulation unit outputs the binary value equal to the previous value of the restored data as the next value of the restored data.

3. The optical wireless reception apparatus according to claim 1, wherein the demodulation unit determines that a preamble is detected when the flashing states of the light source are equal for four consecutive images.

4. The optical wireless reception apparatus according to claim 1, wherein the demodulation unit determines that a preamble is detected when the flashing states of the light source are equal for three consecutive images.

5. The optical wireless reception apparatus according to claim 1, wherein the demodulation unit outputs first restored data after detecting a preamble as a binary value 1.

6. The optical wireless reception apparatus according to claim 1, wherein the demodulation unit outputs restored data for two images after detecting a preamble as a binary value.

7. The optical wireless reception apparatus according to claim 1, wherein the demodulation unit detects a position of the light source based on the images obtained by photographing the light source at the first sampling rate.

8. The optical wireless reception apparatus according to claim 7, wherein the demodulation unit obtains identification information of the light source from the restored data of the first data rate.

9. The optical wireless reception apparatus according to claim 7, wherein the image reception unit receives images obtained by photographing the light source at a second sampling rate higher than the first sampling rate from a second image sensor, and the demodulation unit outputs restored data having a second data rate higher than the first data rate based on the images obtained by photographing the light source at the second sampling rate.

10. The optical wireless reception apparatus according to claim 9, wherein the second image sensor photographs the light source at the second sampling rate based on a position of the light source, which is detected based on the images obtained by photographing the light source at the first sampling rate.

11. The optical wireless reception apparatus according to claim 9, wherein the demodulation unit restores the restored data of the second data rate from the images obtained by photographing the light source at the second sampling rate based on the position of the light source, which is detected based on the images obtained by photographing the light source at the first sampling rate.

12. The optical wireless reception apparatus according to claim 1, wherein the images are photographed by a rolling shutter scheme, and the demodulation unit obtains restored data with respect to different rows in which the light source is photographed in the two consecutive images, and determines final restored data through a majority voting based on the restored data.

13. An optical wireless reception method, the optical wireless reception method comprising:
  receiving, by an image reception unit, images obtained by photographing a light source at a first sampling rate from a first image sensor; and
  outputting, by a demodulation unit, restored data of a first data rate based on the images,
  wherein the first data rate is half of the first sampling rate, and the outputting of the restored data of the first data rate comprises comparing flashing states of the light source with respect to two consecutive images, and outputting a binary value identical to or opposite to a previous value of the restored data as a next value of the restored data.

* * * * *